(12) United States Patent
Runius

(10) Patent No.: US 11,130,440 B2
(45) Date of Patent: Sep. 28, 2021

(54) ASSEMBLY AND METHOD FOR JOINING VEHICLE BODY STRUCTURES

(71) Applicant: Volvo Car Corporation, Gothenburg (SE)

(72) Inventor: Håkan Runius, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/371,389

(22) Filed: Apr. 1, 2019

(65) Prior Publication Data

US 2020/0307441 A1    Oct. 1, 2020

(51) Int. Cl.
*B60Q 1/04* (2006.01)
*F21S 41/19* (2018.01)

(52) U.S. Cl.
CPC ............. *B60Q 1/0408* (2013.01); *F21S 41/19* (2018.01)

(58) Field of Classification Search
CPC ............................... B60Q 1/0408; F21S 41/19
USPC .......................................................... 362/487
See application file for complete search history.

(56) References Cited

U.S. PATENT DOCUMENTS

| | | | |
|---|---|---|---|
| 6,257,043 B1 | 7/2001 | Wiens | |
| 8,087,720 B2 | 1/2012 | Wang | |
| 2007/0296249 A1* | 12/2007 | Tao | B21D 19/12 296/29 |
| 2012/0202013 A1* | 8/2012 | Song | B21D 39/02 428/174 |
| 2012/0248810 A1 | 10/2012 | Song et al. | |
| 2017/0297476 A1 | 10/2017 | Iwao et al. | |

FOREIGN PATENT DOCUMENTS

| | | |
|---|---|---|
| DE | 4224423 A1 | 1/1994 |
| DE | 19824932 A1 | 12/1998 |
| JP | 2006282104 A | 10/2006 |
| JP | 2009220700 A | 10/2009 |
| JP | 2014172463 A | 9/2014 |
| WO | 2008101451 A1 | 8/2008 |

OTHER PUBLICATIONS

Sep. 10, 2020 European Search Report issued on International Application No. 20163807.

* cited by examiner

*Primary Examiner* — Christopher M Raabe
(74) *Attorney, Agent, or Firm* — Clements Bernard Walker; Christopher L. Bernard

(57) ABSTRACT

A vehicle structure assembly, including: a first component including a hem structure defining an internal space disposed along an outer edge thereof; and a second component including one of an outer edge and a corresponding hem structure defining a corresponding internal space, wherein the one of the outer edge and the corresponding hem structure defining the corresponding internal space of the second component is adapted to securely engage the hem structure defining the internal space of the first component, thereby joining the second component to the first component. The first component includes a planar body portion and the hem structure includes a retaining arm or flap structure disposed substantially parallel to the planar body portion, wherein the retaining arm or flap structure and the planar body portion are integrally formed and collectively define the internal space.

22 Claims, 5 Drawing Sheets

ASSEMBLY AND METHOD FOR JOINING VEHICLE BODY STRUCTURES

TECHNICAL FIELD

The present disclosure relates generally to the automotive field. More specifically, the present disclosure relates to an assembly and method for joining vehicle body structures. For example, the assembly and method can be used to join a rear lamp housing or fender assembly to a body panel without the use of a conventional flange and weld, bond, or rivets.

BACKGROUND

Conventionally, a rear lamp housing, fender assembly, or the like is joined to the adjacent sheet metal (steel or aluminum) body panel by welding, bonding, or riveting. As illustrated in FIGS. 1 and 2, the body panel 10 of the vehicle typically includes a recessed flange 12 stamped or formed along a mating edge thereof. The adjoined housing or assembly 14 is then disposed partially over this recessed flange 12 and welded, bonded, or riveted to it. This creates a uniform finish joint between the exterior of the sculpted portion 16 of the body panel 10 and the adjoining edge 18 of the housing or assembly 14.

In the case of a rear lamp housing, for example, the housing 14 may include an inner lamp housing 14a and an outer lens cover 14b. The inner lamp housing 14a holds the light-emitting diode (LED) devices and/or the like and provides the associated electrical connections and is typically manufactured from a durable plastic material. The outer lens cover 14b is typically manufactured from an optically-transparent plastic material and is affixed to the inner lamp housing 14a such that light from the LED devices is visible outside the vehicle. One or both of the inner lamp housing 14a and the outer lens cover 14b can be coupled to the recessed flange 12 of the body panel 10 along the adjoining edge 18 thereof.

Disadvantageously, the use of the recessed flange 12 creates an optically-opaque overlap area between the sculpted portion 16 of the body panel 10 and the bulk of the rear lamp housing, along the adjoining edge 18 of the housing 14. This compromises the desired design aesthetic with respect to illuminated area. The recessed flange 18 can also encroach on illuminated area that may be required by law, obstructing required lighting angles, for example. A better means for joining such body structures is thus needed in the art, providing a uniform finish joint while eliminating this overlap dead space.

SUMMARY

In various exemplary embodiments, the present disclosure provides an assembly and method for joining vehicle body structures that provides a uniform finish joint while eliminating overlap dead space. Instead of a recessed flange, a body panel incorporates a 180-degree bend or hem structure along the adjoining edge thereof. This hem structure is relatively easy to manufacture, as compared to a recessed flange. An adjoining edge or corresponding hem structure of the associated rear lamp housing, fender assembly, or the like is then disposed within the hem structure, effectively coupling the two components together. Optionally, an adhesive or the like can be used to strengthen this joint and prevent rubbing noise, etc.

In the case of a rear lamp housing, for example, an adjoining edge or corresponding hem structure of the inner lamp housing can be mated with the hem structure of the body panel. Subsequently, the outer lens cover can be coupled to the inner lamp housing, with the edge of the outer lens cover sitting directly adjacent to and flush with the end edge of the hem structure. This eliminates any overlap dead space associated with a recessed flange, and the entire area of the outer lens cover can be illuminated, satisfying all design aesthetic and legal requirements.

Optionally, to promote manufacturing efficiency, the inner lamp housing can include an inner body piece coupled to an outer trim piece, where only the outer trim piece is hemmed to the body panel. It will be readily apparent to those of ordinary skill in the art that a fender assembly or the like may also utilize a one-piece construction for hemming purposes, or a multi-piece construction, as provided for the rear lamp housing. Although a fender assembly does not present illumination concerns, the finish joint of the present invention promotes manufacturing efficiency and quality regardless.

In one exemplary embodiment, the present disclosure provides a vehicle structure assembly, including: a first component including a hem structure defining an internal space disposed along an outer edge thereof; and a second component including one of an outer edge and a corresponding hem structure defining a corresponding internal space, wherein the one of the outer edge and the corresponding hem structure defining the corresponding internal space of the second component is adapted to securely engage the hem structure defining the internal space of the first component, thereby joining the second component to the first component. The first component includes a planar body portion and the hem structure includes a retaining arm or flap structure disposed substantially parallel to the planar body portion, wherein the retaining arm or flap structure and the planar body portion are integrally formed and collectively define the internal space. Optionally, the second component includes a planar body portion and the corresponding hem structure includes a retaining arm or flap structure disposed substantially parallel to the planar body portion, wherein the retaining arm or flap structure and the planar body portion are integrally formed and collectively define the corresponding internal space. Optionally, the vehicle structure assembly further includes one or more of an adhesive material and a resilient material disposed within the internal space defined by the hem structure of the first component and contacting the one of the outer edge and the corresponding hem structure of the second component.

In another exemplary embodiment, the present disclosure provides a rear lamp assembly for a vehicle, including: a body panel including a hem structure defining an internal space disposed along an outer edge thereof; and an inner lamp housing including one of an outer edge and a corresponding hem structure defining a corresponding internal space, wherein the one of the outer edge and the corresponding hem structure defining the corresponding internal space of the inner lamp housing is adapted to securely engage the hem structure defining the internal space of the body panel, thereby joining the inner lamp housing to the body panel. The body panel includes a planar body portion and the hem structure includes a retaining arm or flap structure disposed substantially parallel to the planar body portion, wherein the retaining arm or flap structure and the planar body portion are integrally formed and collectively define the internal space. Optionally, the inner lamp housing includes a planar body portion and the corresponding hem structure includes a retaining arm or flap structure disposed substantially parallel to the planar body portion, wherein the retaining arm or flap structure and the planar body portion are integrally formed and collectively define the corresponding internal space. Preferably, the inner lamp housing is adapted to be disposed substantially adjacent to an interior surface of the body panel. Optionally, the inner lamp housing includes: an outer trim piece including the one of the outer edge and the corresponding hem structure defining the corresponding internal space; and an inner body piece adapted to be coupled to the outer trim piece. Optionally, the rear lamp assembly further includes one or more of an adhesive material and a resilient material disposed within the internal space defined by the hem structure of the body panel and contacting the one of the outer edge and the corresponding hem structure of the inner lamp housing. The rear lamp assembly further includes an outer lens cover adapted to be coupled to the inner lamp housing, with an edge of the outer lens cover disposed substantially adjacent to the outer edge of the body panel such that no portion of the outer lens cover is blocked from illumination by a light source disposed within the inner lamp housing.

In a further exemplary embodiment, the present disclosure provides a method of joining vehicle body structures, including: forming a hem structure defining an internal space along an outer edge of a first component; and securely engaging one of an outer edge and a corresponding hem structure defining a corresponding internal space of a second component with the hem structure defining the internal space of the first component. The first component includes a planar body portion and the hem structure includes a retaining arm or flap structure disposed substantially parallel to the planar body portion, wherein the retaining arm or flap structure and the planar body portion are integrally formed and collectively define the internal space. Optionally, the second component includes a planar body portion and the corresponding hem structure includes a retaining arm or flap structure disposed substantially parallel to the planar body portion, wherein the retaining arm or flap structure and the planar body portion are integrally formed and collectively define the corresponding internal space. Optionally, the method further includes disposing one or more of an adhesive material and a resilient material within the internal space defined by the hem structure of the first component and contacting the one of the outer edge and the corresponding hem structure of the second component with the one or more of the adhesive material and the resilient material. Preferably, forming the hem structure defining the internal space along an outer edge of the first component includes bending the outer edge of the first component to form a retaining arm or flap structure disposed substantially parallel to a planar body portion of the first component. Optionally, the first component includes a body panel of the vehicle and the second component includes an inner lamp housing of a rear lamp assembly of the vehicle. Optionally, the inner lamp housing includes: an outer trim piece including the one of the outer edge and the corresponding hem structure defining the corresponding internal space; and an inner body piece adapted to be coupled to the outer trim piece. Optionally, the second component further includes an outer lens cover adapted to be coupled to the inner lamp housing, with an edge of the outer lens cover disposed substantially adjacent to the outer edge of the body panel such that no portion of the outer lens cover is blocked from illumination by a light source disposed within the inner lamp housing.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, the present disclosure provides an assembly and method for joining vehicle body structures that provides a uniform finish joint while eliminating overlap dead space. Instead of a recessed flange, a body panel incorporates a 180-degree bend or hem structure along the adjoining edge thereof. This hem structure is relatively easy to manufacture, as compared to a recessed flange. An adjoining edge or corresponding hem structure of the associated rear lamp housing, fender assembly, or the like is then disposed within the hem structure, effectively coupling the two components together. Optionally, an adhesive or the like can be used to strengthen this joint and prevent rubbing noise, etc.

In the case of a rear lamp housing, for example, an adjoining edge or corresponding hem structure of the inner lamp housing can be mated with the hem structure of the body panel. Subsequently, the outer lens cover can be coupled to the inner lamp housing, with the edge of the outer lens cover sitting directly adjacent to and flush with the end edge of the hem structure. This eliminates any overlap dead space associated with a recessed flange, and the entire area of the outer lens cover can be illuminated, satisfying all design aesthetic and legal requirements.

Optionally, to promote manufacturing efficiency, the inner lamp housing can include an inner body piece coupled to an outer trim piece, where only the outer trim piece is hemmed to the body panel. It will be readily apparent to those of ordinary skill in the art that a fender assembly or the like may also utilize a one-piece construction for hemming purposes, or a multi-piece construction, as provided for the rear lamp housing. Although a fender assembly does not present illumination concerns, the finish joint of the present invention promotes manufacturing efficiency and quality regardless.

Figure 1:
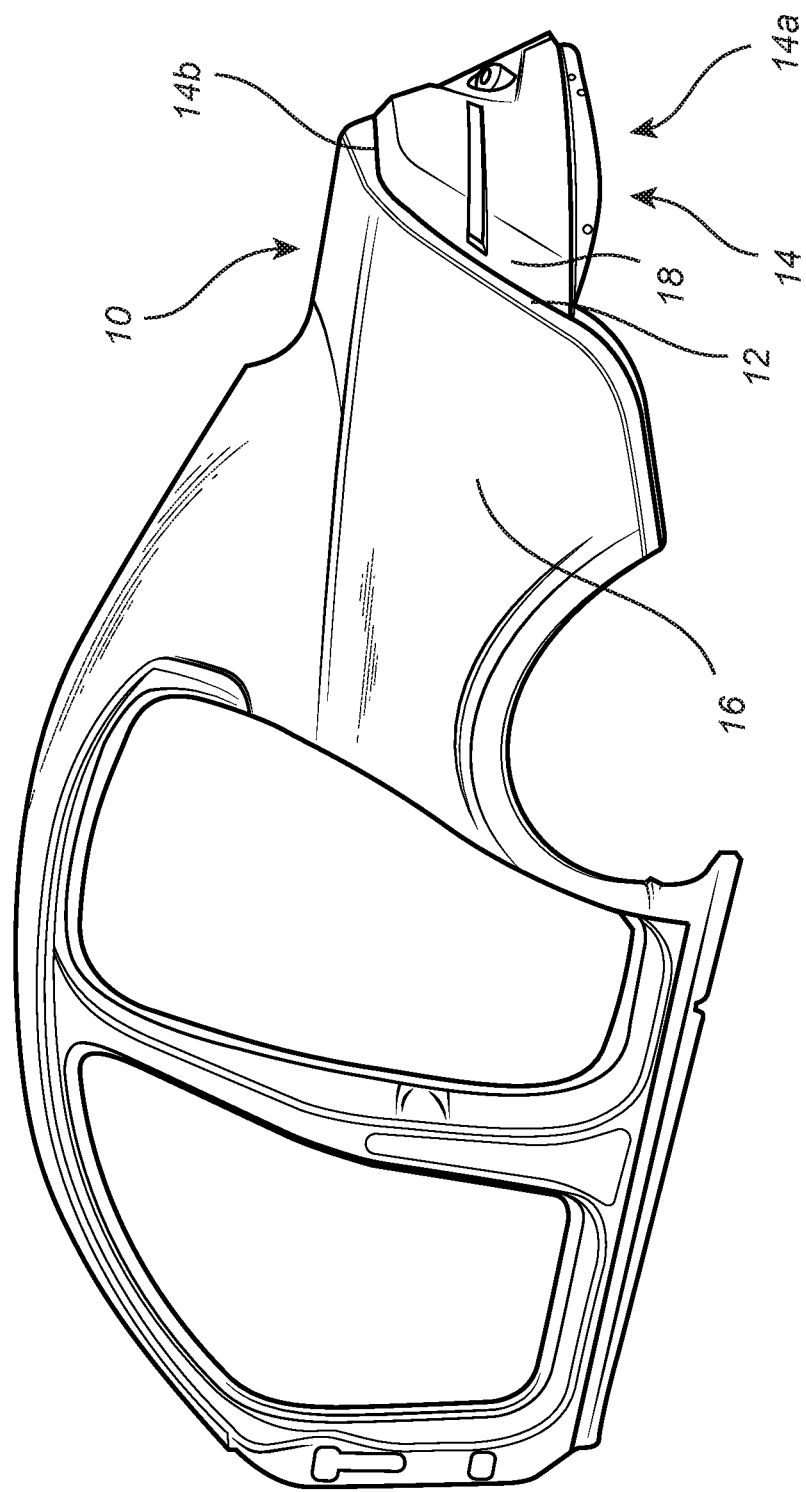
FIG. 1 is a partial exploded perspective view illustrating the conventional joining of a body panel and the rear lamp housing of a vehicle, specifically highlighting the placement of an outer lens cover of the rear lamp housing.
Figure 2:
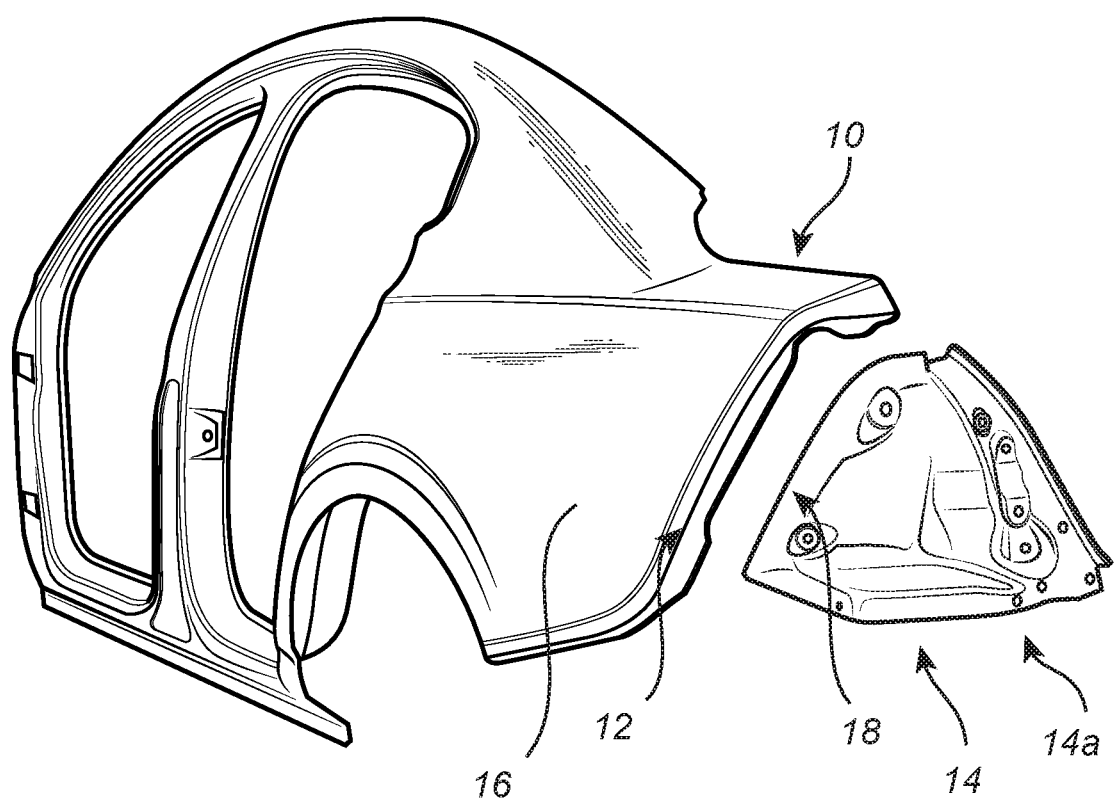
FIG. 2 is another partial exploded perspective view illustrating the conventional joining of a body panel and the rear lamp housing of a vehicle, specifically highlighting the placement of an inner lamp housing of the rear lamp housing.
Figure 3:
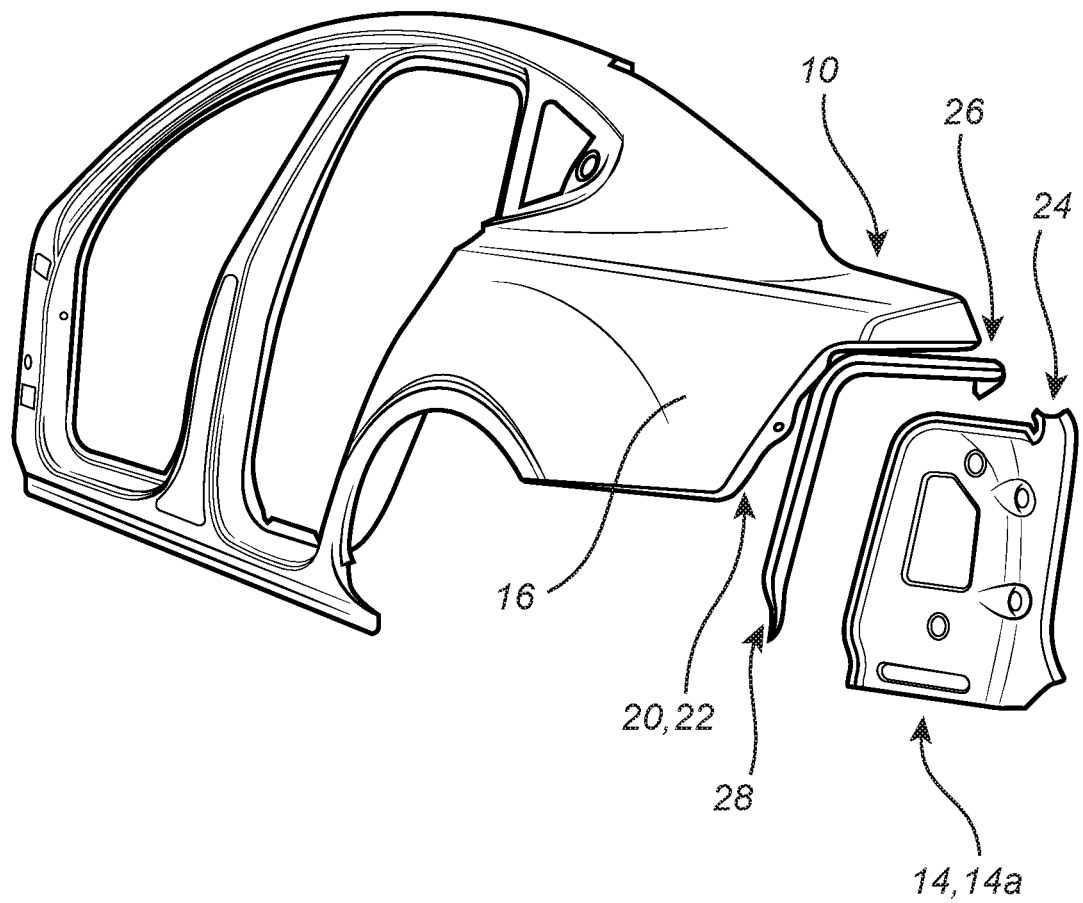
FIG. 3 is a partial exploded perspective view illustrating one exemplary embodiment of the assembly and method for joining vehicle body structures of the present disclosure, specifically highlighting the coupling of a two-piece inner lamp housing of a rear lamp housing to a body panel using a hem structure and method.

Referring now specifically to FIG. 3, in one exemplary embodiment, the body panel 10 of the present disclosure includes a sculpted portion 16 that generally provides the vehicle with its outward appearance and a hem structure 20 formed along an adjoining edge 22 thereof. Both the sculpted portion 16 and the hem structure 20 consist of sheet metal (steel or aluminum) that is formed into the desired shape(s) in a conventional manner, and painted, coated, and/or otherwise finished as desired. The hem structure 22 includes a 180-degree bend in the edge 22 of the sheet metal, with the sheet metal being bent from outside to inside from the perspective of the vehicle. Preferably, the inside retaining arm of the hem structure 20 is only long enough to receive and retain an edge or corresponding hem structure of the adjoined component. A space is formed between the inside retaining arm of the hem structure 20 and the sculpted portion 16 of the body panel 10. The edge or corresponding hem structure of the adjoined component fits and is retained within this space. Optionally, an adhesive, resilient material, or the like can be used to strengthen this joint and prevent rubbing noise, etc. It should be noted that the hem structure 20 can traverse the edge 22 of the sheet metal along various planes corresponding to the angles and curves of the sculpted portion 16 of the body panel 10.

Here, the adjoined component is the inner lamp housing 14a of a rear lamp housing 14, and, more specifically, an inner lamp housing 14a including an inner body piece 24 that is selectively coupled to an outer trim piece 26. The hem structure 20, outer trim piece 26, and inner body piece 24 all have substantially conformal interconnecting profiles. It should be noted that the outer trim piece 26 and inner body piece 24 can also be integrally formed or each include any desired number of sub-components without departing from the scope of the present disclosure. In the embodiment illustrated, the outer trim piece 26 includes the outside edge or corresponding hem structure 28 that is disposed and retained within the hem structure 20 of the body panel 10, thereby affixing the outer trim piece 26 to the body panel 10 along a non-overlapping exterior joint line. Thus, the inner body piece 24 and the inner lamp housing 14a in general, are affixed to the body panel 10 along the non-overlapping joint line.

Although not illustrated here, the outer lens cover is then coupled to the inner lamp housing 14a, with an edge of the outer lens cover being disposed adjacent to an end of the hem structure 20 and the edge 22 of the sheet metal, such that the outer lens cover and the sculpted portion 16 of the body panel 10 do not overlap. This then allows the entirety of the outer lens cover to be illuminated in the rear lamp housing example.

Again, the adjoined component does not have to be a rear lamp housing 14. The process of the present disclosure can be used to join a body panel to any type of component, such as a fender assembly or the like.

Figure 4:
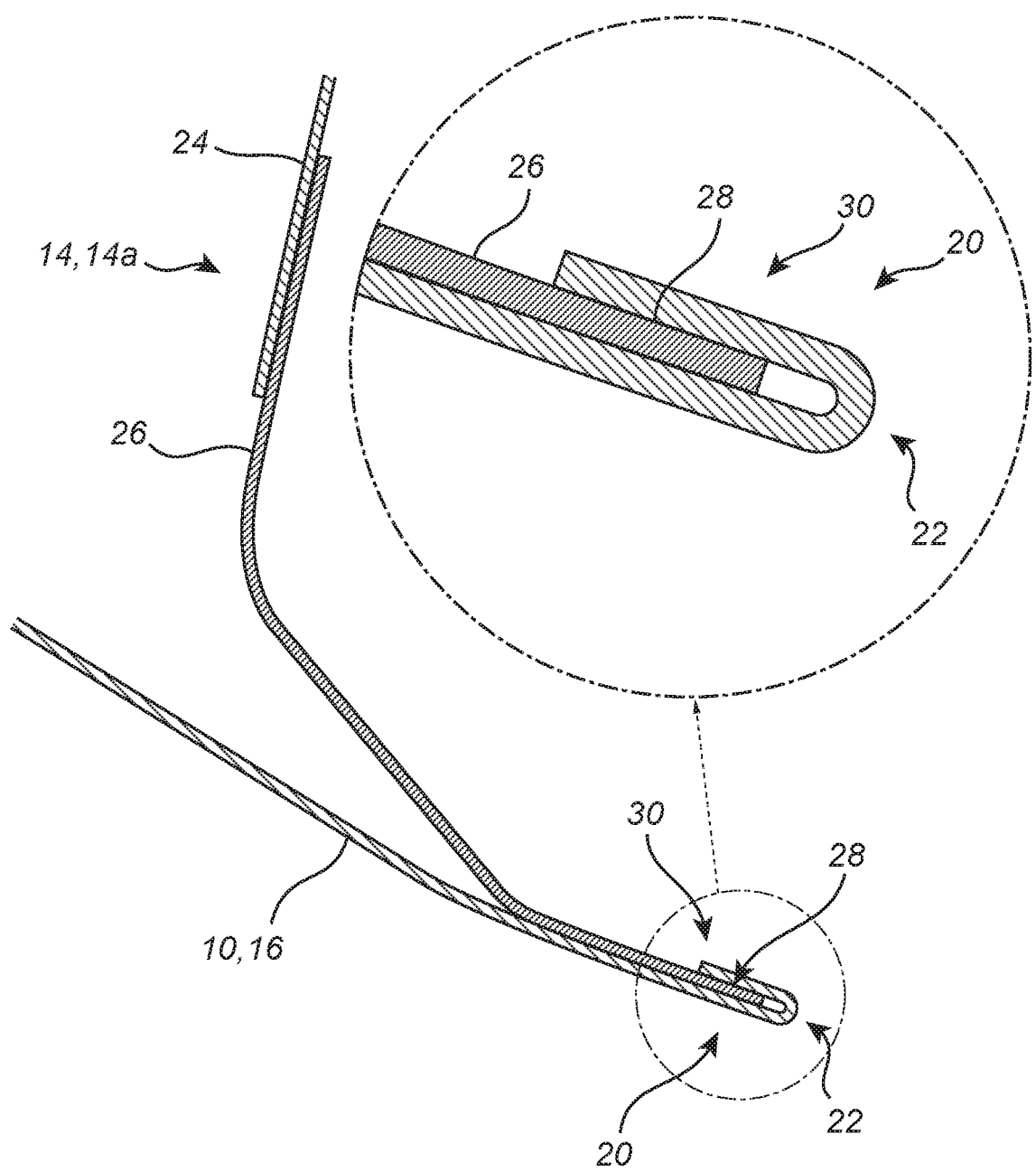
FIG. 4 is a partial schematic diagram illustrating one exemplary embodiment of the assembly and method for joining vehicle body structures of the present disclosure, specifically highlighting the coupling of a multi-piece inner lamp housing of a rear lamp housing to a body panel using a hem structure and method.

Referring now specifically to FIG. 4, in a bit more detail, the body panel 10 of the present disclosure includes a sculpted portion 16 that generally provides the vehicle with its outward appearance and a hem structure 20 formed along an adjoining edge 22 thereof. Both the sculpted portion 16 and the hem structure 20 consist of sheet metal (steel or aluminum) that is formed into the desired shape(s) in a conventional manner, and painted, coated, and/or otherwise finished as desired. The hem structure 22 includes a 180-degree bend in the edge 22 of the sheet metal, with the sheet metal being bent from outside to inside from the perspective of the vehicle. Preferably, the inside retaining arm 30 of the hem structure 20 is only long enough to receive and retain an edge or corresponding hem structure 28 of the adjoined component. A space is formed between the inside retaining arm 30 of the hem structure 20 and the sculpted portion 16 of the body panel 10. The edge or corresponding hem structure 28 of the adjoined component fits and is retained within this space. Optionally, an adhesive, resilient material, or the like can be used to strengthen this joint and prevent rubbing noise, etc. It should be noted that the hem structure 20 can traverse the edge 22 of the sheet metal along various planes corresponding to the angles and curves of the sculpted portion 16 of the body panel 10.

Here, the adjoined component is the inner lamp housing 14a of a rear lamp housing 14, and, more specifically, an inner lamp housing 14a including an inner body piece 24 that is selectively coupled to an outer trim piece 26. The hem structure 20, outer trim piece 26, and inner body piece 24 all have substantially conformal interconnecting profiles. It should be noted that the outer trim piece 26 and inner body piece 24 can also be integrally formed or each include any desired number of sub-components without departing from the scope of the present disclosure. In the embodiment illustrated, the outer trim piece 26 includes the outside edge or corresponding hem structure 28 that is disposed and retained within the hem structure 20 of the body panel 10, thereby affixing the outer trim piece 26 to the body panel 10 along a non-overlapping exterior joint line. Thus, the inner body piece 24, and the inner lamp housing 14a in general, are affixed to the body panel 10 along the non-overlapping joint line.

Figure 5:
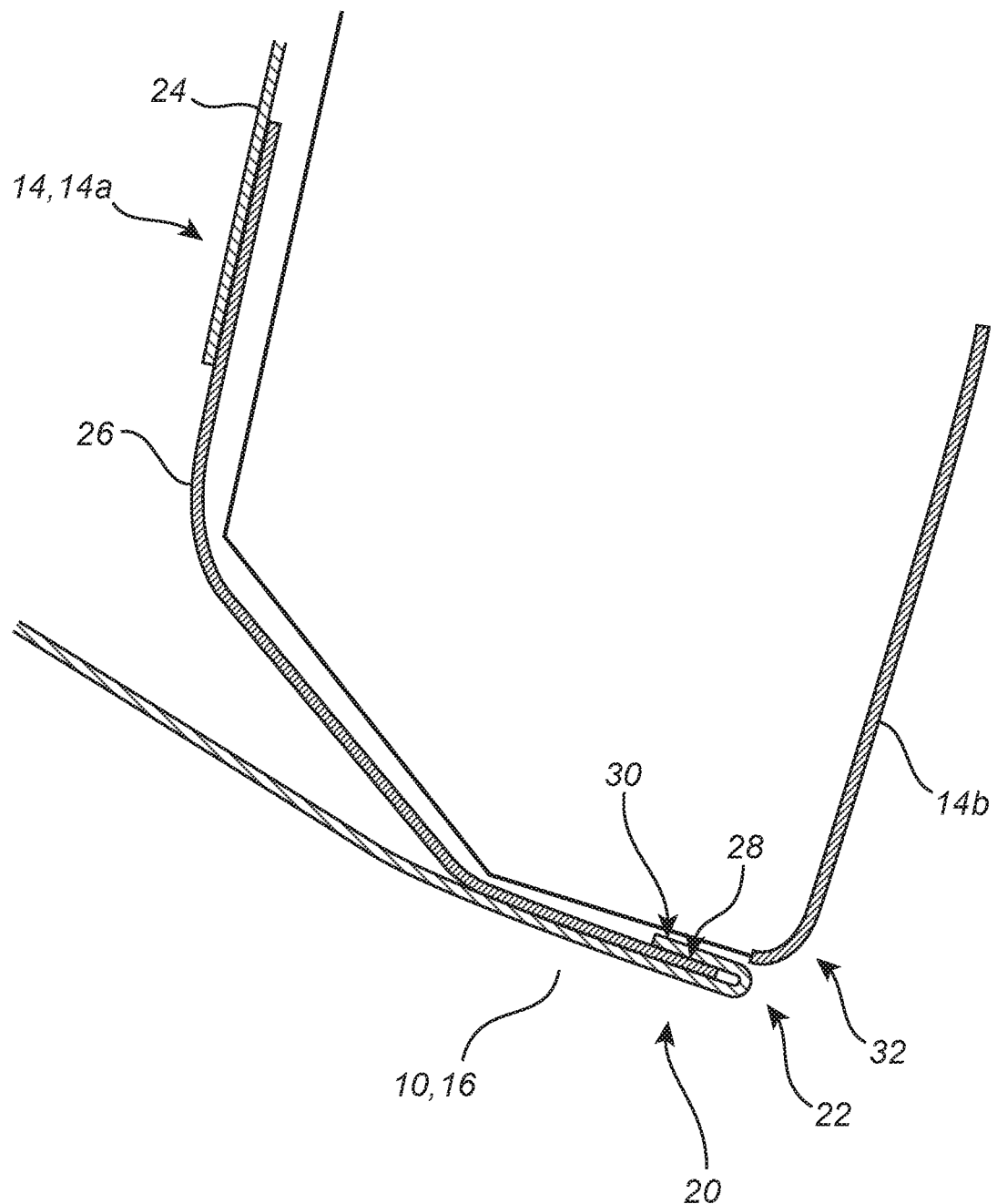
FIG. 5 is another partial schematic diagram illustrating one exemplary embodiment of the assembly and method for joining vehicle body structures of the present disclosure, specifically highlighting the coupling of a multi-piece inner lamp housing of a rear lamp housing to a body panel using a hem structure and method, as well as the subsequent placement of the associated outer lens cover.

Referring now specifically to FIG. 5, the outer lens cover 14b is then coupled to the inner lamp housing 14a, with an edge 32 of the outer lens cover 14b being disposed adjacent to the end 22 of the hem structure 20 and the coincident edge 22 of the sheet metal, such that the outer lens cover 14b and the sculpted portion 16 of the body panel 10 do not overlap. This then allows the entirety of the outer lens cover 14b to be illuminated in the rear lamp housing example.

Thus, again, the present disclosure provides an assembly and method for joining vehicle body structures that provides a uniform finish joint while eliminating overlap dead space. Instead of a recessed flange, a body panel incorporates a 180-degree bend or hem structure along the adjoining edge thereof. This hem structure is relatively easy to manufacture, as compared to a recessed flange. An adjoining edge or corresponding hem structure of the associated rear lamp housing, fender assembly, or the like is then disposed within the hem structure, effectively coupling the two components together. Optionally, an adhesive or the like can be used to strengthen this joint and prevent rubbing noise, etc.

In the case of a rear lamp housing, for example, an adjoining edge or corresponding hem structure of the inner lamp housing can be mated with the hem structure of the body panel. Subsequently, the outer lens cover can be coupled to the inner lamp housing, with the edge of the outer lens cover sitting directly adjacent to and flush with the end edge of the hem structure. This eliminates any overlap dead space associated with a recessed flange, and the entire area of the outer lens cover can be illuminated, satisfying all design aesthetic and legal requirements.

Optionally, to promote manufacturing efficiency, the inner lamp housing can include an inner body piece coupled to an outer trim piece, where only the outer trim piece is hemmed to the body panel. It will be readily apparent to those of ordinary skill in the art that a fender assembly or the like may also utilize a one-piece construction for hemming purposes, or a multi-piece construction, as provided for the rear lamp housing. Although a fender assembly does not present illumination concerns, the finish joint of the present invention promotes manufacturing efficiency and quality regardless.

It should be noted that, as used herein, "hem structure" refers generally to a structure including a piece of material that has been turned or folded back on itself 180 degrees to form an intervening retention space, like a "hairpin," "clip," or the like. Advantageously, such structures are readily formable using convention metal forming and/or plastic molding processes, for example. As used herein, "planar" refers to a flat structure that could also include bends, curves, concavities, convexities, and/or the like, such as a body panel, a hollow housing, or the like.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle structure assembly, comprising:
a first component comprising a hem structure defining an internal space disposed along an outer edge thereof, wherein the hem structure comprises a 180-degree bend formed in the outer edge of the first component, and wherein the first component comprises a body panel of a vehicle; and
a second component comprising a corresponding hem structure defining a corresponding internal space, wherein the corresponding hem structure comprises a 180-degree bend formed in the outer edge of the second component, wherein the corresponding hem structure defining the corresponding internal space of the second component is adapted to securely engage the hem structure defining the internal space of the first component, thereby joining the second component to the first component, and wherein the second component comprises one of a rear lamp assembly housing and a fender assembly of the vehicle.

2. The vehicle structure assembly of claim 1, wherein the first component comprises a planar body portion and the hem structure comprises a retaining arm or flap structure disposed substantially parallel to the planar body portion, wherein the retaining arm or flap structure and the planar body portion are integrally formed and collectively define the internal space.

3. The vehicle structure assembly of claim 1, wherein the second component comprises a planar body portion and the corresponding hem structure comprises a retaining arm or flap structure disposed substantially parallel to the planar body portion, wherein the retaining arm or flap structure and the planar body portion are integrally formed and collectively define the corresponding internal space.

4. The vehicle structure assembly of claim 1, further comprising one or more of an adhesive material and a resilient material disposed within the internal space defined by the hem structure of the first component and contacting the corresponding hem structure of the second component.

5. The vehicle structure assembly of claim 1, wherein the hem structure formed in the outer edge of the first component defines an internal space with a uniform width adjacent to the 180-degree bend formed in the outer edge of the first component.

6. The vehicle structure assembly of claim 1, wherein the hem structure formed in the outer edge of the second component defines an internal space with a uniform width adjacent to the 180-degree bend formed in the outer edge of the second component.

7. A rear lamp assembly for a vehicle, comprising:
a body panel comprising a hem structure defining an internal space disposed along an outer edge thereof, wherein the hem structure comprises a 180-degree bend formed in the outer edge of the body panel;
an inner lamp housing comprising one of an outer edge and a corresponding hem structure defining a corresponding internal space, wherein the corresponding hem structure comprises a 180-degree bend formed in the outer edge of the inner lamp housing, wherein the one of the outer edge and the corresponding hem structure defining the corresponding internal space of the inner lamp housing is adapted to securely engage the hem structure defining the internal space of the body panel, thereby joining the inner lamp housing to the body panel; and
an outer lens cover adapted to be coupled to the inner lamp housing, with an edge of the outer lens cover disposed substantially adjacent to the 180-degree bend formed in the outer edge of the body panel and the one of the outer edge and the corresponding hem structure defining the corresponding internal space of the inner lamp housing such that an entirety of the outer lens cover is able to be illuminated by a light source disposed within the inner lamp housing and a portion of the outer lens covering being flush with an outer surface of the body panel.

8. The rear lamp assembly of claim 7, wherein the body panel comprises a planar body portion and the hem structure comprises a retaining arm or flap structure disposed substantially parallel to the planar body portion, wherein the retaining arm or flap structure and the planar body portion are integrally formed and collectively define the internal space.

9. The rear lamp assembly of claim 7, wherein the inner lamp housing comprises a planar body portion and the corresponding hem structure comprises a retaining arm or flap structure disposed substantially parallel to the planar body portion, wherein the retaining arm or flap structure and the planar body portion are integrally formed and collectively define the corresponding internal space.

10. The rear lamp assembly of claim 7, wherein the inner lamp housing is adapted to be disposed substantially adjacent to an interior surface of the body panel.

11. The rear lamp assembly of claim 7, wherein the inner lamp housing comprises:
an outer trim piece comprising the one of the outer edge and the corresponding hem structure defining the corresponding internal space; and
an inner body piece adapted to be coupled to the outer trim piece.

12. The rear lamp assembly of claim 7, further comprising one or more of an adhesive material and a resilient material disposed within the internal space defined by the hem structure of the body panel and contacting the one of the outer edge and the corresponding hem structure of the inner lamp housing.

13. A method of joining vehicle body structures, comprising:
forming a hem structure defining an internal space along an outer edge of a first component, wherein the hem structure comprises a 180-degree bend formed in the outer edge of the first component; and securely engaging a corresponding hem structure defining a corresponding internal space of a second component with the hem structure defining the internal space of the first component, wherein the corresponding hem structure comprises a 180-degree bend formed in the outer edge of the second component;

wherein the first component comprises a body panel of the vehicle; and wherein the second component comprises one of an inner lamp housing of a rear lamp assembly and a fender assembly of the vehicle.

14. The method of claim 13, wherein the first component comprises a planar body portion and the hem structure comprises a retaining arm or flap structure disposed substantially parallel to the planar body portion, wherein the retaining arm or flap structure and the planar body portion are integrally formed and collectively define the internal space.

15. The method of claim 13, wherein the second component comprises a planar body portion and the corresponding hem structure comprises a retaining arm or flap structure disposed substantially parallel to the planar body portion, wherein the retaining arm or flap structure and the planar body portion are integrally formed and collectively define the corresponding internal space.

16. The method of claim 13, further comprising disposing one or more of an adhesive material and a resilient material within the internal space defined by the hem structure of the first component and contacting the corresponding hem structure of the second component with the one or more of the adhesive material and the resilient material.

17. The method of claim 13, wherein forming the hem structure defining the internal space along an outer edge of the first component comprises bending the outer edge of the first component to form a retaining arm or flap structure disposed substantially parallel to a planar body portion of the first component.

18. The method of claim 13, wherein the inner lamp housing comprises:

an outer trim piece comprising the one of the outer edge and the corresponding hem structure defining the corresponding internal space; and an inner body piece adapted to be coupled to the outer trim piece.

19. The method of claim 13, wherein the second component further comprises an outer lens cover adapted to be coupled to the inner lamp housing, with an edge of the outer lens cover disposed substantially adjacent to the outer edge of the body panel such that no portion of the outer lens cover is blocked from illumination by a light source disposed within the inner lamp housing.

20. A lamp assembly for a vehicle, comprising:

an inner lamp housing of a rear lamp assembly comprising one of an outer edge and a hem structure defining an internal space, wherein the hem structure comprises a 180-degree bend formed in the outer edge of the inner lamp housing, wherein the one of the outer edge and the hem structure defining the internal space of the inner lamp housing is adapted to securely engage a corresponding hem structure defining a corresponding internal space of a body panel of the vehicle, wherein the corresponding hem structure comprises a 180-degree bend formed in an outer edge of the body panel, thereby joining the inner lamp housing to the body panel; and an outer lens cover adapted to be coupled to the inner lamp housing, with an edge of the outer lens cover disposed substantially adjacent to the 180-degree bend formed in the outer edge of the body panel and the one of the outer edge and the corresponding hem structure defining the corresponding internal space of the inner lamp housing such that an entirety of the outer lens cover is able to be illuminated by a light source disposed within the inner lamp housing and a portion of the outer lens covering being flush with an outer surface of the body panel.

21. The lamp assembly of claim 20, wherein the inner lamp housing is adapted to be disposed substantially adjacent to an interior surface of the body panel.

22. The lamp assembly of claim 20, wherein the inner lamp housing comprises:

an outer trim piece comprising the one of the outer edge and the hem structure defining the internal space; and an inner body piece adapted to be coupled to the outer trim piece.

* * * * *